May 15, 1951 M. DRUETTA 2,552,888
BALING MACHINE
Filed April 3, 1946 3 Sheets-Sheet 1

INVENTOR
Miguel Druetta
BY
ATTORNEY

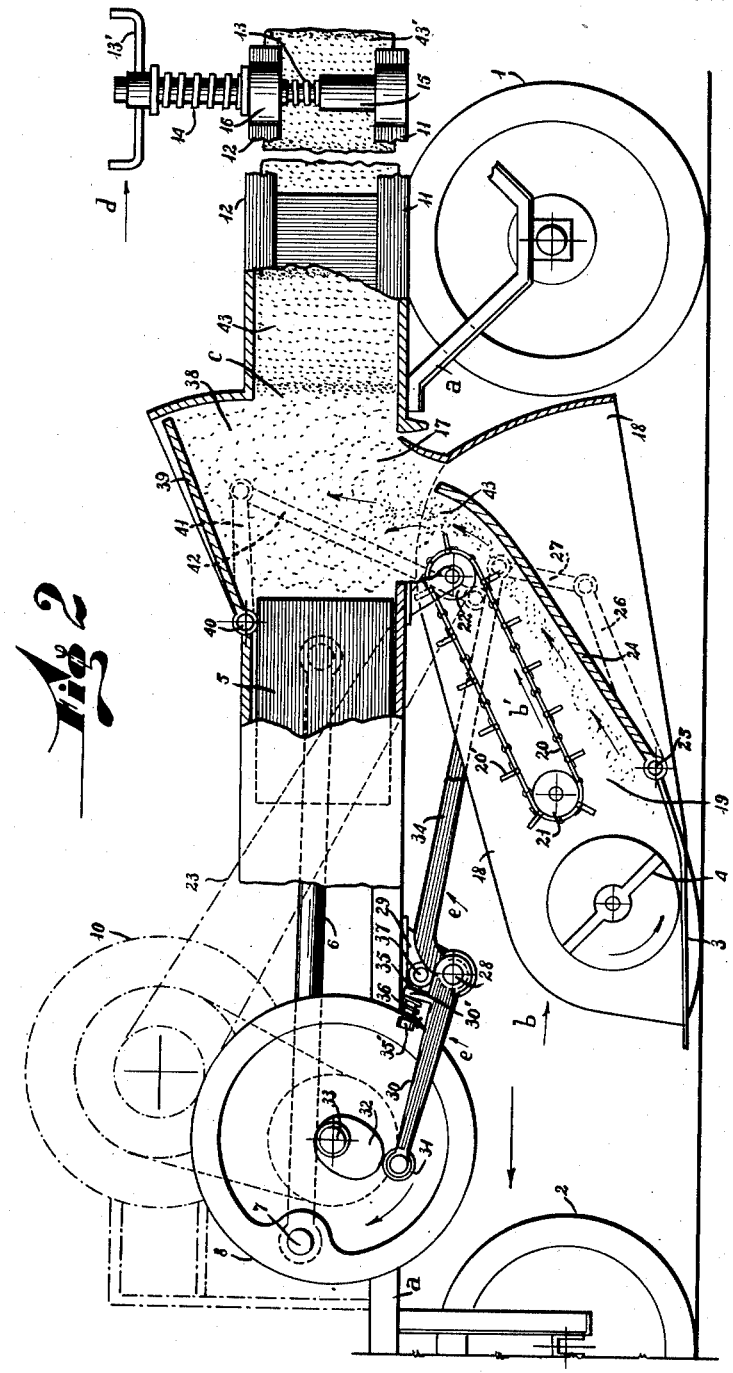

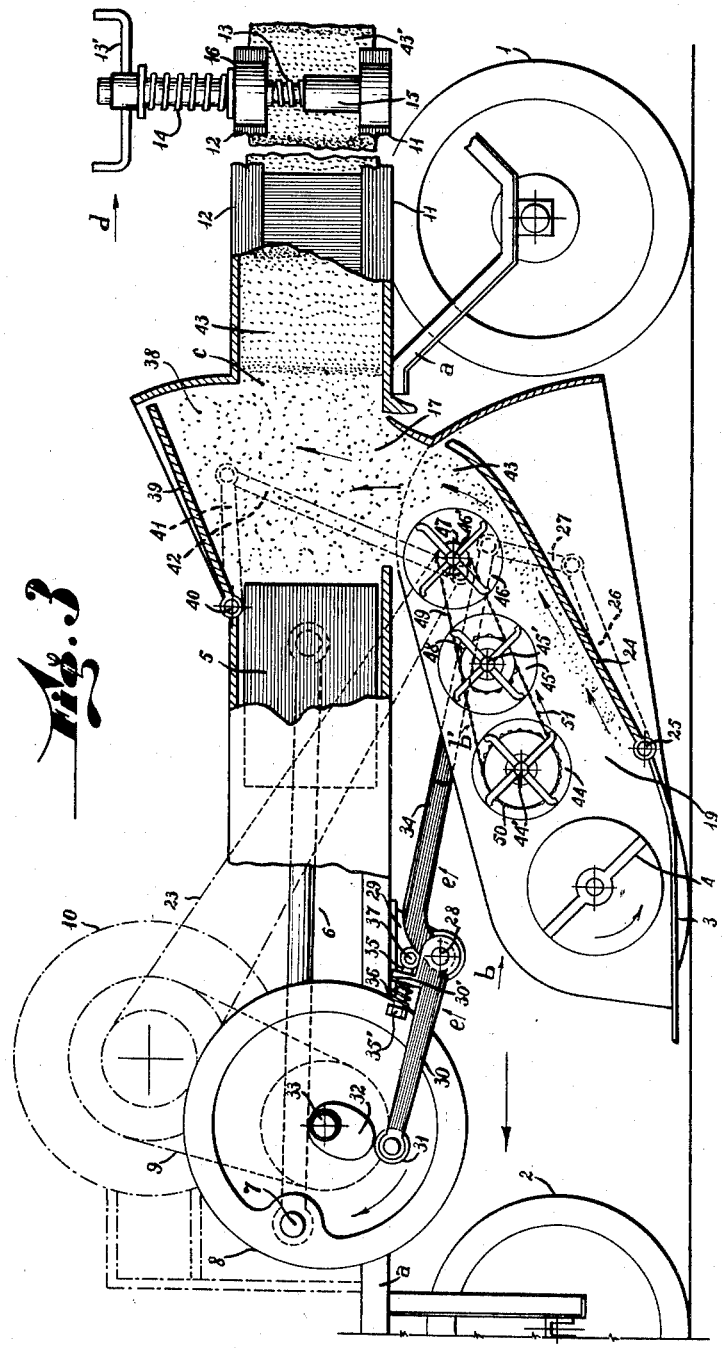

Patented May 15, 1951

2,552,888

UNITED STATES PATENT OFFICE 2,552,888

BALING MACHINE

Miguel Druetta, Buenos Aires, Argentina

Application April 3, 1946, Serial No. 659,266
In Argentina January 19, 1946

9 Claims. (Cl. 100—25)

My present invention relates to a baling machine.

It is an object of my present invention to provide a baling machine which performs the picking up, storing, compacting and hoisting of the material in one continuous cycle.

A further object of my invention is a machine which has a high degree of reliability and is considerably simplified as compared with existing machines.

Another object of my invention is to provide for a machine which performs the tasks indicated but has a simplified construction and a considerably reduced weight. Allied with this object is the purpose to provide a machine which is less expensive in manufacture and easier to handle.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a similar view of the machine at a time when the accumulation of material has been completed and the accumulated charge is being fed into the compression chamber; and Fig. 3 is a fragmentary view, partly in section, illustrating another embodiment wherein a different kind of feed means is employed.

Figure 1:
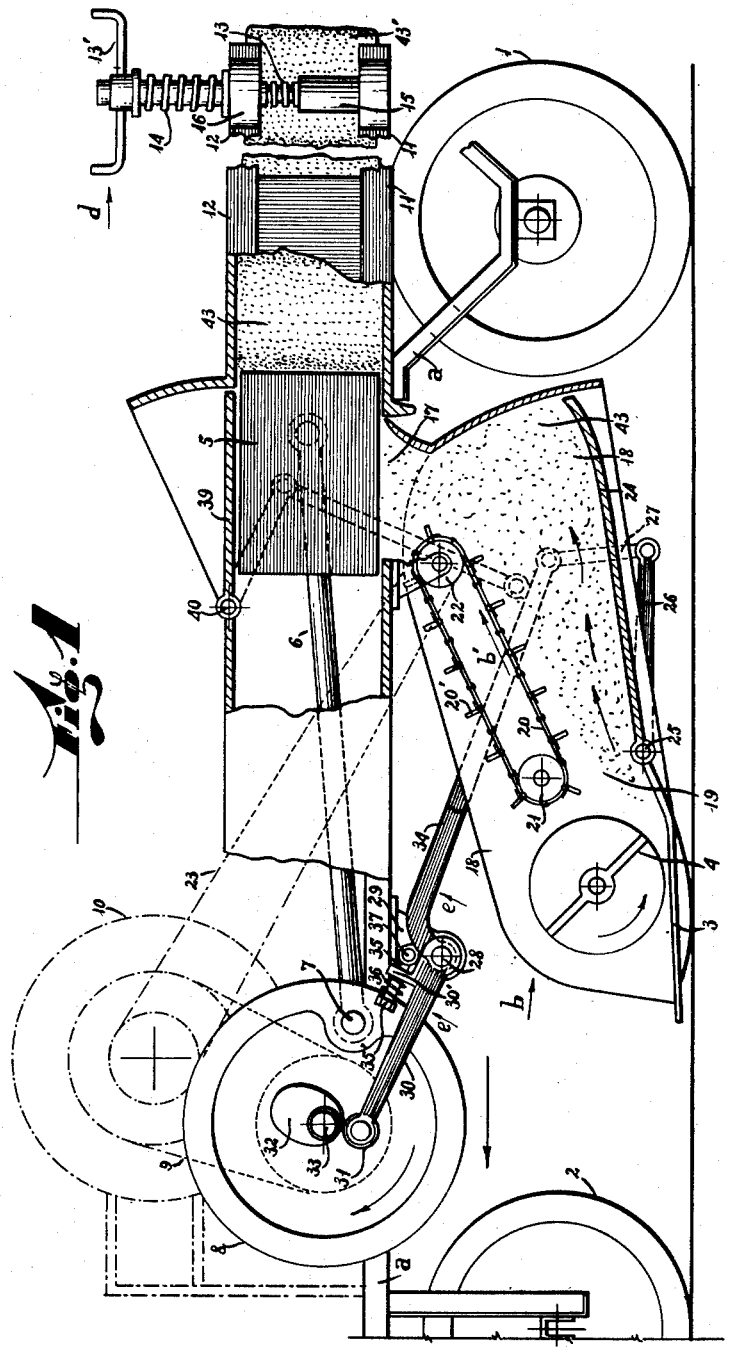
Fig. 1 is a side view of the machine partly in section illustrating the machine in the position when the material is being accumulated and the piston of the machine is about to complete its compression stroke.

With reference to the drawings, it will be seen that my machine comprises a feed table 3 above which a pick-up device 4 is disposed which gathers the stalks or stems and delivers the same to a feeding device generally indicated by b'. This part of the machine is similar to that of a conventional harvester machine. However, since my machine has the object of baling straw, feed grain or other vegetable material, it includes a bale chamber generally indicated by c, in which a piston 5 reciprocates in the same manner as a piston in a pump cylinder. The piston 5 is connected by the piston rod 6 and crank 7 with the fly wheel 8. The latter through the belt 9, receives power from a driving wheel 10 which may be coupled to the running wheels of the machine or to a suitable type of prime power.

The bale chamber c is provided with an extension composed of two platen members 11 and 12 which together with the clamping mechanism generally designated as d form a pressure device which may be adjusted in the manner presently to be described. The pressure device comprises a shaft provided with a threaded end 13 and a handle 13' at its other end. The shaft passes through a boss 16 which is provided in the upper platen 12 and has its threaded end secured in a stub shaft 15 which rises from the lower platen 11. Interposed between the handle 13' and the boss 16 by means of suitable washers is a spring device 14. Pressure adjustment can thus easily be effected by turning of the handle 13'.

It will now be understood that the compression of the material entering the bale chamber c takes place under the reciprocating action of the piston 5 which latter is accomplished by the eccentric position of the crank pin 7 on fly wheel 8.

The bale chamber c is provided with a bottom opening 17. Below the bale chamber a housing b is provided which has an elongated form and houses the feed table 3, the pick-up device 4, and the feed device b'. The outlet of the housing passes directly into the bottom opening 17 of the bale chamber. In the housing an accumulating space 18 is formed beneath the feeding device b'. In the embodiment illustrated in Figs. 1 and 2, the feeding device b' consists of a conveyor formed by an endless chain 20 having cross members 20' and moving over rollers 21 and 22. The drive for the conveyor is provided by a belt 23 which connects the roller 22 with the drive wheel 10. The conveyor acts in the direction indicated by the arrow.

The housing b at the portion formed by the accumulating chamber 18 is provided with a movable bottom portion 24. The bottom is fixed to the shaft 25 to turn therewith; this shaft is arranged transversely of the housing b. The shaft 25 is sufficiently spaced from the feeding device b' to permit passing of the material from the pick-up device 4 through the inlet channel 19 into the accumulating chamber 18 and into the range of action of the feeding device b'. The bottom 24 by means of the shaft 25 is coupled to a lever arm 26 which through link 27 is connected to a lever device generally designated as e.

The lever device e comprises a lever arm 30 and a lever arm 34. The two arms are movably connected in the following manner: Both arms are pivoted to a spindle 28 which is maintained in the stationary support portion 29. The lever arm 30 is provided near one end with an apertured bracket 30'. A shank 35 is movable on a pivot 37 mounted on lever arm 34. The shank passes through bracket 30' and is provided at its free end with a head piece 35'. Disposed on shank 35 between the bracket 30' and the head piece 35' is a spring 36. The other end of the lever arm 30 is provided with a roller 31 which moves in engagement with a cam 32 which latter rotates with shaft 33 of the fly wheel 8.

The bale chamber c has an upper extension 38 which is closed by a swing flap 39 and constitutes an expansion chamber. The flap is movably connected through the pivoted arms 41 and 42 to the lever arm 34.

The operation of the machine is as follows:

When the machine moves by self-propulsion or as in a tractor, the forward movement over the ground will force the material, for instance, stalks of straw or grain, to fall on the feed table 3, and then to be delivered by the pick-up device 4 into the interior of the housing b through the inlet channel 19. When the bottom 24 is in its lower position, as shown in Fig. 1, the material will accumulate in the chamber 16. Since the operating mechanism for the bottom is actuated by means of the shaft 33 and cam 32, the bottom will move up as soon as the piston retracts to the position shown in Fig. 2 to uncover the bottom opening 17 of the bale chamber c. If there is an obstruction in the course of bottom portion 24 the lever arm 30 is still free to move since it will then compress spring 36, without moving the lever arm 34. The strength of the spring, however, will be so selected that compression occurs only if the movement of bottom 24 is obstructed.

The upward movement of the bottom 24 will cause the material, as generally indicated at 43, to come within the range of the feeding device b' and in particular, of the cross members 20'. The material then is fed through the opening 17 into the bale chamber c where it has sufficient space for movement during retraction of the piston because the expansion chamber 38 in the top of the bale chamber c is being opened at the same time. Such opening is effected by coupling the flap 39 through levers 41, 42 to the movement of the main lever e.

As soon as the forward movement of the piston commences flap 39 is lowered and, at the same time, bottom 24 also moves downward until the position illustrated in Fig. 1 is reached.

During the compression stroke the piston 5 compresses the material 43 and also shoves a mass of compressed material 43' into the space between the pressure platens 11 and 12. The spring device 14 permits pressure to be effected while it assures a yielding movement when the pressure exceeds a predetermined limit. Thus, the compressed stalks will gradually issue from the bale chamber and will fall to the ground after being assembled in the required manner.

When the piston retracts again into the position of Fig. 2 the cycle of operations will be repeated.

In the embodiment shown in Fig. 3 the feeding device b' is formed by a plurality of rotary drums 44, 45 and 46. The drums are provided with suitable blades for moving the material forward. The shafts 44', 45', and 46' of the drums extend transversely of the receptacle b and are driven by chains 49, 51 which cooperate with sprocket wheels 47, 48 and 50. The number of teeth in the individual sprocket wheels is decreased from the outermost wheel 50 to the innermost wheel 47. Thus, each drum in succession toward the inner end of the housing b moves at a higher speed than the preceding drum.

In this manner, straw or other material gripped by the blades of the first drum 44 is moved with increasing speed toward the opening 17 and into the bale chamber.

It will be understood that each of the elements described above, or two or more together, may also find a useful application in other types of baling machines.

While I have illustrated and described the invention as embodied in a baling machine, I do not intend to be limited to the details shown, since various modifications and structural changes may be made without departing in any way from the spirit of my invention.

What I claim as new and desire to secure by Letters Patent is:

1. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; feed means disposed in said housing for feeding the material received in said inlet opening through said outlet opening into said bale chamber; a movable bottom portion forming part of said housing; and means coupled to said drive means for said piston for displacing said bottom portion toward said feed means.

2. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; an endless conveyor and mounting means therefor disposed in said housing for feeding the material received in said inlet opening through said outlet opening into said bale chamber; a movable bottom portion forming part of said housing; and means coupled to said drive means for said piston for displacing said bottom portion toward said feed means.

3. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; there being an accumulating chamber formed by the space within said housing intermediately of said inlet opening and said outlet opening; feed means disposed in said housing above said accumulating chamber for feeding the material received in said inlet opening through said outlet opening into said bale chamber; a movable bottom portion forming part of said housing; and means for displacing said bottom portion toward said feed means so as to vary the rate of flow through said housing and the rate of accumulation in said accumulating chamber, the said means for displacing said bottom portion being coupled to said drive means for said piston.

4. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; a plurality of feed drums disposed in said housing transversely thereof for feeding the material received in said inlet opening through said outlet opening into said bale chamber; a movable bottom portion forming part of said housing; and means coupled to said drive means for said piston for displacing said bottom portion toward said feed means.

5. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; there being an accumulating chamber formed by the space within said housing intermediately of said inlet opening and said outlet opening; a plurality of feed drums disposed in succession in said housing above said accumulating chamber for feeding the material received in said inlet opening through said outlet opening into said bale chamber; means coupled to said drive means of the piston for moving said drums, the said latter means being formed so as to impart to the individual drums rates of speed increasing from the outermost drum to the innermost drum; a movable bottom portion forming part of said housing; and means for displacing said bottom portion toward said feed drums so as to vary the rate of flow through said housing and the rate of accumulation in said accumulating chamber, the said means for displacing said bottom portion being coupled to said drive means for said piston.

6. A baling machine comprising in combination a bale chamber provided with an opening in the lower portion thereof; a drive shaft; a rotary member secured to said drive shaft; a compressor piston reciprocable within said bale chamber; a piston rod, one end of said piston rod being secured to said rotary member and the other end being secured to said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; feed means disposed in said housing for feeding the material received in said inlet opening through said outlet opening into said bale chamber; a movable bottom portion forming part of said housing; a cam member secured to said drive shaft; and lever means engaged at one end by said cam member and connected at the other end to said movable bottom portion for displacing the same toward said feed means so as to be timed with the movement of said piston.

7. A baling machine comprising in combination a bale chamber provided with an opening in the lower portion thereof; a drive shaft; a rotary member secured to said drive shaft; a compressor piston reciprocable within said bale chamber; a piston rod, one end of said piston rod being secured to said rotary member and the other end being secured to said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; feed means disposed in said housing for feeding the material received in said inlet opening through said outlet opening into said bale chamber; a movable bottom portion forming part of said housing; a cam member secured to said drive shaft; lever means engaged at one end by said cam member and connected at the other end to said movable bottom portion for displacing the same toward said feed means so as to be timed with the movement of said piston; two cooperating lever arms pivoted on a common fulcrum and forming part of said lever means; and a spring connection between said cooperating lever arms.

8. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; feed means disposed in said housing for feeding the material received in said inlet opening through said outlet opening into said bale chamber; a movable bottom portion forming part of said housing; means for displacing said bottom portion toward said feed means; an expansion chamber associated with said bale chamber; a swingably mounted flap normally closing said expansion chamber against said bale chamber; and common actuating means for said flap and said means for displacing said bottom portion.

9. A baling machine comprising in combination a bale chamber provided with an opening in the lower portion thereof; a compressor piston reciprocable within said bale chamber; drive means for said piston; a housing disposed below said bale chamber and provided with an inlet opening for the material to be baled disposed at one end of said housing and an outlet opening disposed at the other end of said housing, the said outlet opening being in communication with the opening in the lower portion of the bale chamber; feed means disposed in said housing for feeding the material received in said inlet opening through said outlet opening into said bale chamber; drive means for said feed means, the said drive means being coupled to said drive means of said piston; a movable bottom portion forming part of said housing; and means, coupled to said drive means of said piston, for displacing said bottom portion toward said feed means.

MIGUEL DRUETTA.

REFERENCES CITED

The following references are of record in the file of this patent:

UNITED STATES PATENTS

| Number | Name | Date |
|---|---|---|
| 2,381,620 | Russell | Aug. 7, 1945 |
| 2,431,828 | Raney | Dec. 2, 1947 |

FOREIGN PATENTS

| Number | Country | Date |
|---|---|---|
| 233,298 | Germany | Apr. 5, 1911 |